UNITED STATES PATENT OFFICE.

WILHELM SCHUMACHER, OF OSNABRÜCK, GERMANY, ASSIGNOR TO ERNST THALMANN, OF NEW YORK, N. Y.

AGGLOMERATED BODY.

No. 864,804.     Specification of Letters Patent.     Patented Sept. 3, 1907.

Original application filed September 16, 1904, Serial No. 234,717. Divided and this application filed December 26, 1906. Serial No. 349,487.

*To all whom it may concern:*

Be it known that I, WILHELM SCHUMACHER, a subject of the Emperor of Germany, and a resident of Osnabrück, Germany, have invented certain new and useful Improvements in Agglomerated Bodies, of which the following is a specification.

My invention relates to agglomerated bodies consisting largely of ores, blast furnace dust, or like mineral substances, which are brought into this shape for the purpose of facilitating their shipment and smelting.

The present application is a division of one filed by me in the United States Patent Office on September 16, 1904, Serial No. 224,717, in which earlier application a process for making such agglomerated bodies is claimed.

As described in the said application, I grind silicious material such as sand, quartz or flint very finely to produce a powder which is impalpable, the particles of which have the form of flakes, needles and other irregular non-prismatic bodies as distinguished from the approximately prismatic or globular shape which even very fine sand has in nature. Such broken-up particles therefore have a much greater surface and less thickness than natural sand particles of the same fineness, that is, particles which will pass through the same screen. This condition of the silicious material greatly promotes the completeness of the subsequent reaction. The second ingredient employed by me is lime in any suitable condition, and the two ingredients are generally provided in about equal amounts, and the ore, blast furnace dust or the like is incorporated with the lime and finely ground silicious material. The addition of lime and silicious material may be about 5% of the material to be agglomerated, but varies according to the nature of the material. The mass is formed into coherent bodies by briqueting, and then hardened by exposing it to the action of steam under pressure in a closed vessel. Instead of this, I might first expose the mixture of lime and silicious material to the action of steam under pressure for a relatively short time, then incorporate this mixture with the ore or other material, and subject the entire mass to the action of steam under pressure.

In either case, calcium silicate is formed, which constitutes a binder for holding the agglomerated ore, etc., together, so that coherent bodies are produced suitable for shipment and smelting or other treatment without premature crumbling.

Agglomerated bodies made in accordance with the above-described process are distinguishable by the fact that only a very small proportion of the silicious material remains uncombined, say not more than from 5 to 10 per cent. of the entire silicious material used. Since, as above stated, the silicious material forms only about 2½ per cent. of the entire mass, the uncombined silicious material remaining in the finished product is only from ⅛ to ¼ of one per cent. of the final product, that is a very small proportion. This amount can be isolated by treating the product with a suitable agent such as hydrochloric acid. By examining the uncombined residue thus isolated, with a magnifying glass or a microscope, the irregular shape of the finely ground silicious material will be recognized readily, differing characteristically from the appearance of sand as it occurs in nature. This irregular shape of the uncombined particles of silicious material can also be ascertained by making slices of the finished product, or polishing its surface, and examining the pieces so treated, under the microscope.

I claim as my invention:

An agglomerated body comprising blast furnace dust or like mineral material, bound into a coherent body by an intimate mixture of silicate of calcium and a very small proportion of silica consisting entirely of jagged particles of the fineness of an impalpable powder, substantially as described.

In testimony whereof, I have hereunto signed my name in the presence of two subscribing witnesses.

WILHELM SCHUMACHER.

Witnesses:
JOHN LOTKA,
JOHN A. KEHLENBECK.